United States Patent

Smith et al.

[11] 3,943,323
[45] Mar. 9, 1976

[54] BONDING APPARATUS

[75] Inventors: Gerald C. Smith; Dennis L. Ellingson; Colin A. Johnson, all of Sidney, N.Y.; Seong K. Rhee, Livonia, Mich.

[73] Assignee: The Bendix Corporation, Southfield, Mich.

[22] Filed: Aug. 23, 1974

[21] Appl. No.: 499,890

[52] U.S. Cl. ............... 219/85; 156/583; 165/185; 219/229; 228/54
[51] Int. Cl.² ............................................ B23K 3/00
[58] Field of Search ...... 156/583; 165/10, 185, 180; 219/85 D, 85 F, 228, 243, 530, 540, 229; 228/51, 52, 53, 54, 55; 338/230

[56] References Cited
UNITED STATES PATENTS

| | | | |
|---|---|---|---|
| 1,120,987 | 12/1914 | Vogel | 219/540 |
| 3,099,084 | 7/1963 | Thuillier | 228/54 |
| 3,136,878 | 6/1964 | Staller | 228/54 |
| 3,569,665 | 3/1971 | Hager | 219/243 |
| 3,582,610 | 6/1971 | Eckles | 219/85 D X |

Primary Examiner—J. V. Truhe
Assistant Examiner—N. D. Herkamp
Attorney, Agent, or Firm—Raymond J. Eifler

[57] ABSTRACT

A bonding head for connecting the electrically conductive leads of a tape cable or the like to other electrical conductors. The bonding head, which applies heat and pressure to the electrical conductors and leads to bond them together, is an elongated member comprised of a material having high mechanical strength but low thermal conductivity which contains a conduit comprised of a material having low mechanical strength but high thermal conductivity. A heating element inserted in the conduit supplies heat to the conduit and bonding head. This arrangement provides a bonding head having a high mechanical strength and hence structural failure and deformation of the bonding head is reduced.

15 Claims, 3 Drawing Figures

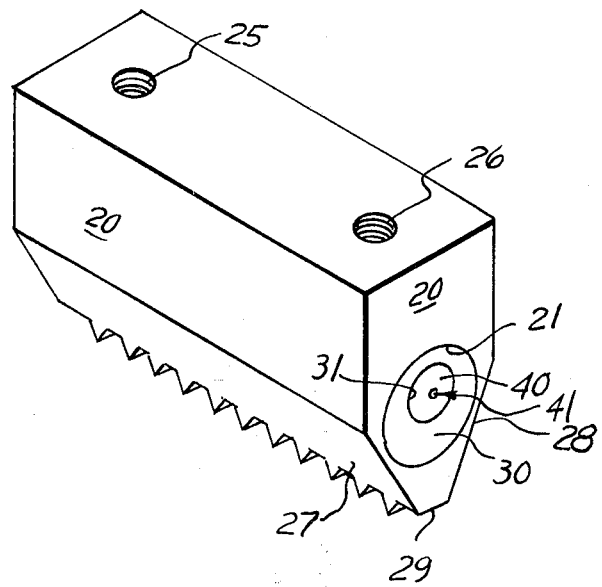
FIG. 1
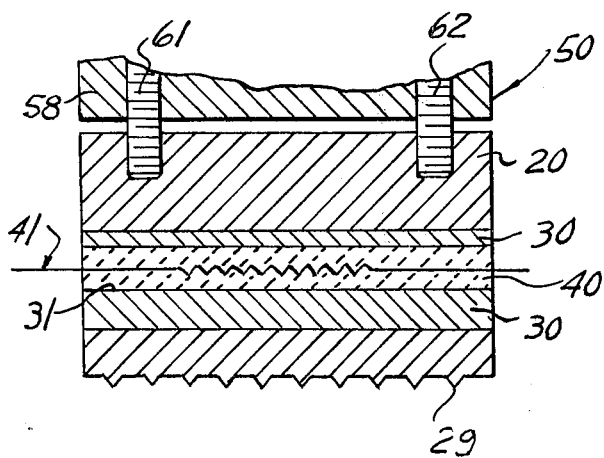
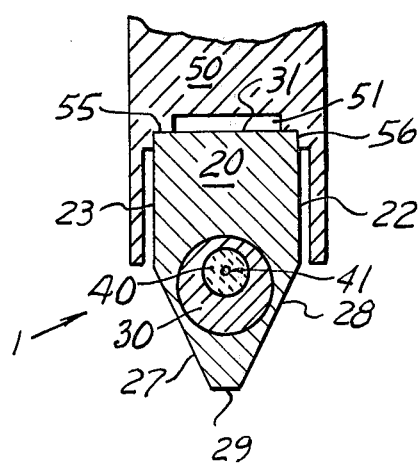

BONDING APPARATUS

BACKGROUND OF THE INVENTION

This invention relates to Energy Pulse Bonding -EPB- and more particularly to a bonding head for applying heat and pressure to electrical conductors which are to be bonded together.

In the fabrication of many electric devices, such as semiconductor devices, printed circuit board panels, flat or tape-type electrical cables and the like, it is often necessary to bond one or more electrically conductive leads to an electrically conductive terminal, lug, or other electrically conductive lead. Typically, such bonds are formed by hand soldering techniques or by other multi-step techniques which necessitate accurately positioning the element to be bonded, feeding a measured quantity of a conductive bonding material, liquifying the material, and properly distributing the material over the bond or connection site. However, regardless of the particular technique employed, it must be such as to assure the formation of a good electrical connection and a mechanically strong and durable bond.

Generally speaking, bonding techniques involving the use of solder often require elaborate means for properly controlling the quantity of solder being fed to a prospective bonding site and the distribution thereof. Additionally, solder bonding techiques often require a particular orientation of the elements being bonded with respect to the bonding means employed, are rather inflexible as to the number of elements that can be bonded simultaneously and, are often limited in their application to bonding elements having a particular size and shape. It will be appreciated that the inability of conventional solder bonding techniques to adequately control the feeding and distribution of solder has rendered them uneconomical, inefficient, and has often resulted in the formation of generally unreliable electrical connections. In an attempt to avoid the problems accompanying the feeding, liquification and distribution of various bonding materials, techniques employing precoated elements have been developed. Generally speaking, these techniques employ elements having a low melting or alloy (i.e., solder) or some other heat-softenable electrically conductive material coated thereon so as to avoid the need for feeding a bonding material to a prospective bond site from a remote source. Although these techniques have reduced a need for independently feeding a measured quantity of bonding materials; have reduced the quantity of material required to effect a bond; and have minimized the difficulties inherent with the elements to be bonded, they are generally incapable of forming mechanically strong bonds. Methods that have been developed to bond together two electrically conductive leads are fusion bonding or energy pulse bonding which contemplate the application of heat and pressure to two electrically conductive materials to bond them together. One example of such a process may be found in U.S. Pat. No. 3,591,755 entitled "Fusion Bonding" issued July 6, 1971 to R. H. Cushman. Fusion bonding is now used extensively for connecting together the electrical leads of thin film and integrated circuits which are commonly manufactured on relatively fragile substrate such as glass, ceramic, silicon or germanium. Also, tape type electrical cables, which are comprised of a sheet of plastic with thin (about 0.001 inches) ribbons of electrically conductive material imbedded therein, may also be connected together or to a circuit with such a fusion bonding process.

The American Welding Society defines "diffusion welding" as a solid state welding process wherein coalescence of the faying surfaces is produced by the application of pressure at elevated temperatures. The process does not involve macroscopic deformation or relative motion of the parts. This definition has been categorized as "diffusion controlled welding." A second category of diffusion welding which requires macroscopic deformation has been referred to as "deformation diffusion welding." Energy pulse bonding falls into this second category where macroscopic deformation at high temperatures is required to decrease bonding times from minutes or hours to seconds and to aid in dispersing surface insulation, contaminants and oxides.

Energy pulse bonding utilizes mechanical pressure and high temperature in the form of a controlled energy pulse of temperature and pressure applied to the junction of two electrical conductors for two to three seconds. The magnitude of the temperature and pressure is determined by the yield strength and melting point of the material with the major role of pressure being to flatten asperites and bring more area into contact, thereby resulting in a greater bulk diffusion across the bond interface. The pressure applied to the junction must be great enough to cause microscopic plastic deformation of the surface irregularities in order to minimize voids at the bond surface. If the bonding surfaces are very irregular and the pressure insufficient, there will be voids left at the interface that cause the formation of a weak joint. The temperature applied to the junction controls the migration of atoms across the bond interface. Therefore, with high bonding temperatures, good bonds can be obtained in a time interval of 2 to 3 seconds. A preferable bonding temperature used in an energy pulse bonding process is between 50 to 75 percent of the melting point of the materials to be bonded. How long the pressure and temperature should be supplied to the junction is of course dependent on the bonding temperature, pressure, and bonding head characteristics i.e., thermal conductivity. Higher pressures (above the yield strength of the material) favor short bonding times while bonding pressures below the yield strength of the material require longer bonding times, possibily several hours to obtain a reliable bond.

Since one parameter of energy pulse bonding is temperature (heat transfer), it is important that the bonding head have a high thermal conductivity. However, materials that exhibit high thermal conductivity generally have poor mechanical strength. Therefore, bonding heads that are comprised of a material having a high thermal conductivity maximize the transfer of heat from the heat source to the bonding surface but have a relatively short life due to mechanical failure, distortion or deformation because of the poor mechanical (tensile) strength of the material; and bonding heads that are comprised of a material having a high tensile strength do not have the thermal conductivity necessary to allow the bonding to be used effectively for energy pulse bonding.

SUMMARY OF THE INVENTION

This invention is a new type of bonding head that has a high tensile strength and good heat transfer characteristics so that the head has an improved life span and is useful for energy pulse bonding.

The invention is bonding head 20 characterized by the fact that it is comprised of a material having poor thermal conductivity, but very good mechanical (tensile) strength and which includes a conduit 30, comprised of a material having a thermal conductivity about 10 times greater than the thermal conductivity of the bonding head 20, located in a longitudinal passage 21 in the bonding head 20. The conduit 30 includes a central passage 31 which is eccentrically arranged in the conduit 30 and which receives a heating element 40.

Accordingly, it is an object of this invention to provide a bonding head that has superior mechanical strength while at the same time is still capable of effective distribution of heat to the bonding surface of the head.

It is another object of this invention to provide a bonding head that has a longitudinal passage that contains a heater element surrounded by a mateial that has a very high thermal conductivity compared to the material of the surrounding bonding head.

It is still another object of this invention to provide a bonding head that has a longer life span than prior art bonding heads.

It is a further object of this invention to provide a bonding head that is comprised of a material having a high tensile strength so that the bonding head resists structural failure and deformation of the bonding surface.

The above and other objects and features of the invention will become apparent from the following detailed description taken in conjunction with the accompanying drawings and claims which form a part of this specification. Further, the use of numerals is for the purpose of clarification and illustration only and is not intended to limit the invention to the specific structure referenced.

BRIEF DESCRIPTION OF THE DRAWINGS

FIG. 1 is a perspective view of a bonding head which incorporates the objects and features of this invention.

FIG. 2 is a cutaway view of the bonding ram which includes a bonding head and a holder for the bonding head.

FIG. 3 is a cutaway view of the bonding ram taken 90° from the view shown in FIG. 2.

DETAILED DESCRIPTION OF THE DRAWINGS

FIG. 1 illustrates a bonding head which includes an elongated body 20; an elongated member or conduit 30 mounted within the body 20; and a heating element 40 which when energized by electrical power dissipates heat through the elongated member 30 and body 20.

The elongated body 20 is comprised of a material having a high tensile strength but poor thermal conductivity. Examples of such materials are carbon steel, nickel-chromium alloys (inconel alloy 718), beryllia, alumina, and tungsten carbide. Inconel is a preferred material because it has a thermal conductivity Btu/(hr)(sq ft) (°F/in.) of about 78° at 70°F and about 135° at 1000° F; and a tensile strength of about 210,000 psi at 70°F and about 185,000 psi at 1000°F. Inconel is especially useful as a bonding head because the tensile strength of the material does not fall off sharply when bonding temperatures of about 1000°F or above are employed. The elongated body 20 has a generally rectangular upper portion with a tapered lower portion comprised of two sides 27 and 28 that taper towards each other and terminate in a bonding surface 29 which is the surface that contacts the junction of electrical conductors (not shown) and applies heat and pressure thereto. The configuration of this particular bonding surface 29 is designed to bond together the ribbon-like electrical conductors of a tape cable to the electrical conductors of another cable or terminal board. One or more threaded bores 25 and 26 are used for attaching the head 20 to a holder or ram portion (not shown) of a bonding machine. The bores 25 and 26 may also be located in any one of the sides of the head 20 to attach the head 20 to a holder (50, FIG. 3) of a bonding ram. Extending longitudinally of the body 20 is a passage 21 which is generally cylindrically shaped and closely spaced to the tapered surfaces 27 and 28 of the bonding head 20.

Located within the longitudinal passage 21 of the head 20 is a conduit or elongated member 30 having the outer surface thereof in contact with the inner walls of the longitudinal passage 21. The elongated member 30 is comprised of a material having a high thermal conductivity, e.g. at least twice and preferably 10 times greater than the thermal conductivity of the head 20. Examples of materials that are preferable for use in fabricating elongated member 30 are aluminum, copper, silver, and alloys and mixtures of the foregoing; a preferred material is copper and aluminum. An elongated member 30 comprised of copper and aluminum oxide (1.1%) would have a thermal conductivity K of about 2,352 at 70°F and about 2,352 at about 800°F. The respective tensile strengths of such a material would be 70,000 psi at 70°F and 30,000 psi at 1000°F. The thermal conductivity K is in units of Btu/(hr)(sq ft)(F/inches). An important feature of the elongated member is the eccentric arrangement of the passage 31 with respect to the member 30. By arranging the conduit passage 31 so that its axis is off center of the axis of the member 30, there is a larger cross-sectional area of material on one side of a diameter of the passage 31 than the other. The portion of the conduit 30 having the larger cross-sectional area of material is arranged to be spaced closer to the tapered sides 27 and 28 of the head 20 so that the member 30 transfers the majority of the heat conducted from within towards the bonding and tapered surfaces 27, 28 and 29. Located in the passage 31 of the member 30 is a heater element 40 which is generally cylindrical-shaped and fits in pressure contact with the inner walls of the member 30. The heater element 40 is preferably an electrical resistance heater (wire 41) which, when energized, dissipates electrical energy in the form of heat radially outward from the heater element 40 through the member 30 and, eventually, the bonding surface 29. Commercially available heater elements may be obtained from ITT Vulcan Electric Company, preferably of the type producing about 120 watts per square inch or may be fabricated from high temperature resistance wire imbedded in a ceramic material such as shown in the drawings.

FIG. 2 is a partial cross-sectional diagram of a portion of a bonding apparatus which includes a ram comprised of a bonding head 1 and a holder 50 for the bonding head which is actuated by a mechanical or pneumatic power source to move the bonding head 1.

The cross-sectional diagram illustrates the eccentric arrangement of the heater element 40 within the elongated member 30 so that the majority of the high thermally conducting material of the conduit 30 is between the heater element and the bonding surface 29 and in close proximity to tapered surfaces 27, 28 and bonding surface 29.

To assure that there is a minimum amount of heat transfer from the bonding head 20 to the holder 50, the holder is comprised of a material having a low thermal conductivity such as stainless steel. The bonding head 50 includes a longitudinal slot 51 that receives the bonding head 1 which is mounted to the bonding head by bolts either through the sides of the holder 50 or from the top of the holder. To further minimize the transfer of heat from the bonding head 20 to the adapter, minimal contact between the holder 50 and the bonding head 20 is obtained by steps 55 and 56 which contact only a small portion of the sides 22, 23 and surface 31 of the head 20, leaving the majority of the surface areas of the surfaces 22, 23, 31 spaced from the holder 50.

FIG. 3 is a transverse cross-sectional view of the bonding head 1 and holder 50 shown in FIG. 2. This figure illustrates an arrangement of bolts 61 and 62 to secure the bonding head 1 to the holder 50 and the resistance wire 41 imbedded in the ceramic material of the elongated member 30.

OPERATION

Referring now to the figures, the bonding head functions as follows: When the heat element 40 is energized, it begins to transfer heat radially outward through the elongated member 30 and bonding head 20. Obviously, some of the heat will be radiated into the air while another small portion of the heat will be transmitted into the holder 50. However, because of the high thermal conductivity of the elongated member 30, most of the heat transferred from the source 40 will be transferred to the lower portion of the bonding head between the tapered sides 27 and 28 and to the bonding surface 29. To bond together two electrical conductors (not shown) the junction between the conductors to be bonded are placed between the ram head bonding surface 29 and another ram head bonding surface 29 or stationary work table. The ram head 20 would then be actuated to apply pressure to the junction while simultaneously the heater element 40 would be actuated or have been actuated to create a high temperature which would then be distributed to the bonding surface 29. Because the bonding surface 29 is made of a material having a high tensile strength, the bonding surface 29 will not be subject to the same deformation and/or fracture as would a bonding surface which was comprised of a good thermal conductor having a low tensile strength.

While a preferred embodiment of the invention has been disclosed, it will be apparent to those skilled in the art that changes may be made to the invention as set forth in the appended claims and, in some instances, certain features of the invention may be used to advantage without corresponding use of other features. For example, the elongated member 30 is shown as having a generally cylindrical shape although other shapes may be used.

Accordingly, it is intended that the illustrative and descriptive materials herein be used to illustrate the principles of the invention and not to limit the scope thereof.

Having described the invention, what is claimed is:

1. A bonding apparatus comprising:
   an elongated body having a longitudinal axis, a longitudinal passage, a first side, a second side opposite said first side, a third side adjacent to and extending between said first and second sides, and a tapered portion comprised of two sides tapering towards each other from said first and second sides respectively and terminating in a sixth surface which is opposite said third side, said elongated body comprised of a material having a thermal conductivity K in units of Btu/(hr)(sq ft)(°F/in.) at 70°F of less than 100,
   a conduit having a bore, said conduit mounted in the longitudinal passage of said elongated body, said conduit comprised of a material having a thermal conductivity at 70°F of greater than 2000.

2. A bonding apparatus as recited in claim 1 wherein the longitudinal axis of the passage in said elongated body is coaxial with the longitudinal axis of said conduit and wherein the longitudinal axis of the bore in said conduit is not coaxial with the longitudinal axis of said passage in said body.

3. A bonding apparatus as recited in claim 2 wherein said bonding apparatus includes:
   means for heating said conduit and said elongated body, said heating means disposed within said conduit bore to distribute heat radially outwardly through said conduit and said elongated body.

4. The apparatus as described in claim 3 including a means for holding said elongated body, said holding means comprised of a material having a thermal conductivity K3 less than 200 at 68°F where K is in units of Btu/(hr)(sq ft) (°F/in.).

5. The apparatus as described in claim 4 wherein said means for holding said bonding head includes a member having a longitudinal slot within which at least a portion of said elongated body is contained, said slot including two shoulders facing in the direction of said slot opening said first shoulder separated from said second shoulder by an inner wall portion which is in contact with a portion of one side of said bonding head with said first shoulder contacting a portion of an adjacent side of said bonding head.

6. The apparatus as recited in claim 5 including a third and fourth shoulder within said slot arranged opposite of said first and second shoulder and facing said slot opening, said third shoulder spaced from said fourth shoulder by an inner wall portion which is in contact with at least a portion of the side opposite said one side of said bonding head with said fourth shoulder contacting a portion of the same adjacent side of the bonding head as said first shoulder.

7. A bonding apparatus comprising:
   an elongated body having a longitudinal passage and a bonding surface, said elongated body comprised of a material having a thermal conductivity K1, and a tensile strength T1; and
   an elongated member mounted within said bore, said member having a longitudinal axis and a longitudinal bore, said member comprised of a material having a thermal conductivity K2 at least two times greater than the thermal conductivity of said body and having a tensile strength T2 which is less than the tensile strength of said body.

8. A bonding apparatus as recited in claim 7 wherein the longitudinal axis of said bore is spaced from the longitudinal axis of said passage in a direction away from said bonding surface.

9. A bonding apparatus as recited in claim 8 wherein said bonding apparatus includes:
means for heating said body and said member, said heating means disposed within the passage in said member.

10. The apparatus as recited in claim 8 wherein the tensile strength T1 of said elongated body is greater than 150,000 psi at 68°F, the thermal conductivity K1 of said elongated body is less than 100 at 68°F, and wherein the tensile strength T2 of said elongated member is less than 100,000 psi at 68°F and the thermal conductivity K2 of said elongated member is greater than 2000 at 68°F wherein
$k$ is in units of Btu/(hr)(sq ft)(°F/in.).

11. The apparatus as described in claim 8 including means for holding said elongated body, said holding means comprised of a material having a thermal conductivity K3 less than 200 at 68°F where $k$ is in units of Btu/(hr)(sq ft)(°F/in.).

12. The apparatus as recited in claim 7 wherein the tensile strength T1 of said elongated body is greater than 150,000 psi at 70°F, the thermal conductivity K1 of said elongated body is less than 100 at 70°F, and wherein the tensile strength T2 of said elongated member is less than 100,000 psi at 70°F and thermal conductivity K2 of said elongated member is greater than 2000 at 70°F; where
$k$ is in units of Btu/(hr)(sq ft)(°F/in.).

13. The apparatus as described in claim 7 including a means for holding said bonding tool, said holding means comprised of a material having a thermal conductivity K3 less than 200 at 70°F where $k$ is in units of Btu/(hr)(sq ft)(°F/in.).

14. The apparatus as described in claim 13 wherein said means for holding said bonding head includes a member having a longitudinal slot within which at least a portion of said elongated body is contained, said slot including two shoulders facing in the direction of said slot opening, said first shoulder separated from said second shoulder by an inner wall portion which is in contact with a portion of one side of said bonding head with said first shoulder contacting a portion of an adjacent side of said bonding head.

15. The apparatus as recited in claim 14 including a third and fourth shoulder within said slot arranged opposite of said first and second shoulder and facing said slot opening, said third shoulder spaced from said fourth shoulder by an inner wall portion which is in contact with at least a portion of the side opposite said one side of said bonding head with said fourth shoulder contacting a portion of the same adjacent side of the bonding head as said first shoulder.

* * * * *